United States Patent [19]

Barker

[11] Patent Number: 5,002,169
[45] Date of Patent: Mar. 26, 1991

[54] RESTRAINING STRAP

[75] Inventor: David C. Barker, Utica, Mich.

[73] Assignee: Automotive Products plc, Warwickshire, England

[21] Appl. No.: 390,105

[22] Filed: Aug. 7, 1989

[51] Int. Cl.$^5$ .............................................. F16D 25/00
[52] U.S. Cl. ...................... 192/85 C; 92/23; 60/568
[58] Field of Search ............... 192/85 C, 91 R; 92/23; 60/568, 570

[56] References Cited

U.S. PATENT DOCUMENTS

| | | | |
|---|---|---|---|
| 4,454,632 | 6/1984 | Nix et al. | 24/16 PB |
| 4,551,976 | 11/1985 | Nix et al. | 60/533 |
| 4,557,361 | 12/1985 | Nix et al. | 192/85 C |
| 4,585,109 | 4/1986 | Shirley | 192/85 CA |
| 4,665,802 | 5/1987 | Barker et al. | 92/23 |
| 4,766,804 | 8/1988 | Barker | 92/23 |

Primary Examiner—Rodney H. Bonck
Assistant Examiner—Nicholas Whitelaw
Attorney, Agent, or Firm—Krass & Young

[57] ABSTRACT

A restraining strap for use with a clutch actuator of the type including a master cylinder, a slave cylinder, a conduit interconnecting the master cylinder and slave cylinder, and a piston in the slave cylinder moved reciprocally in the bore of the slave cylinder housing in response to operation of the vehicle clutch pedal. The clutch actuator is delivered in prefilled form without output member of the slave cylinder, which is assembled by the motor vehicle manufacturer as a part of the clutch release lever assembly, and a restraining strap is provided to maintain the piston of the slave cylinder in a retracted position to maintain the prefilled system in a pressurized state and preclude the entry of air into the system during shipment, storage and installation of the system. The restraining strap includes a pair of strips secured at their rear ends to the front end of the slave cylinder housing and extending forwardly therefrom to a location forwardly of the front end of the slave cylinder housing and a reentrant tubular portion extending rearwardly into the open front end of the bore of the slave cylinder housing for engagement with the front end of the piston to maintain the piston in a retracted position.

35 Claims, 1 Drawing Sheet

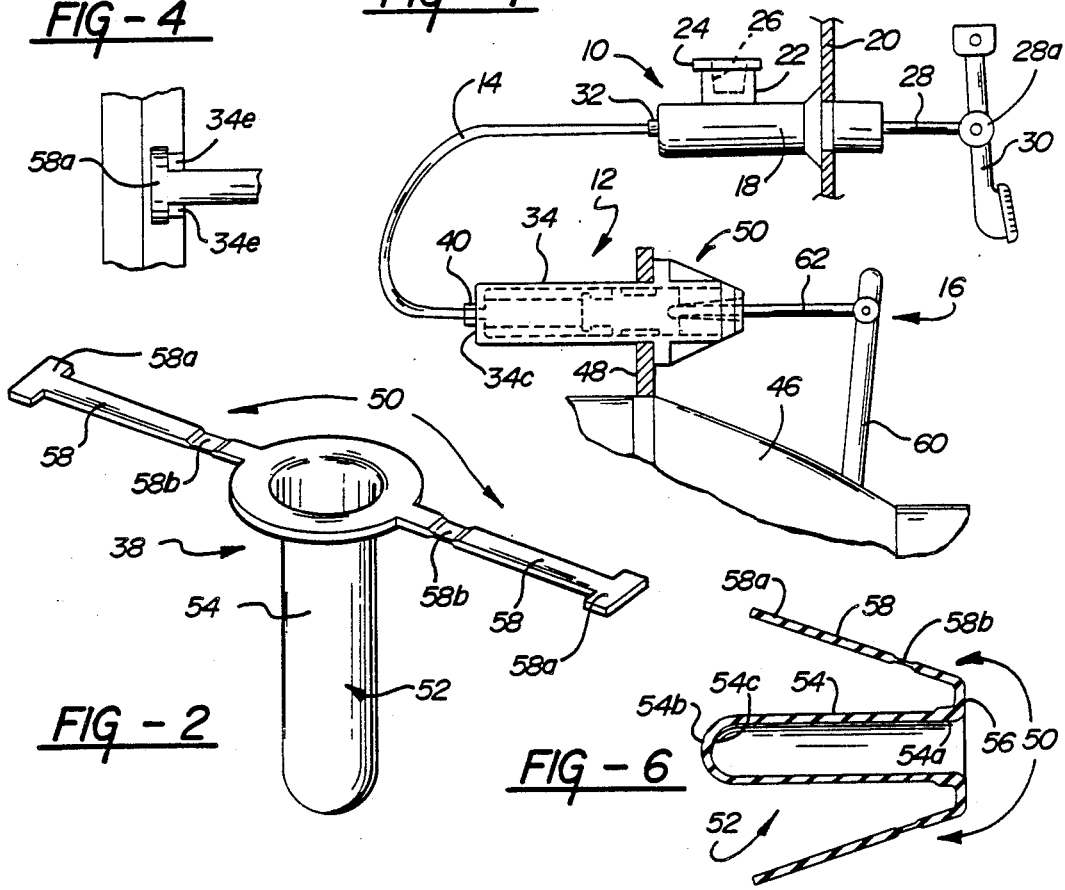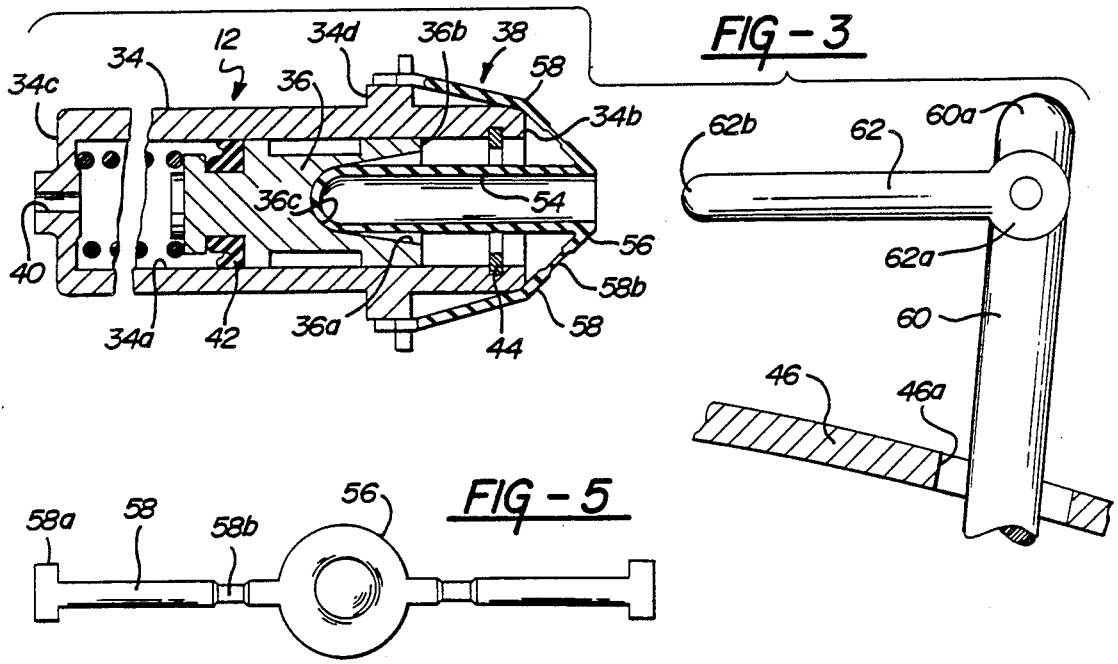

RESTRAINING STRAP

The present invention relates to a restraining strap for use with a hydraulic cylinder assembly and more particularly relates to a restraining strap to maintain the output member of the slave cylinder of a hydraulic clutch actuator in a retracted position during transportation, storage and installation of the actuator.

Hydraulic actuators are known for operating a mechanism at a remote location by way of a master cylinder connected to a slave cylinder installed at the remote location. A conduit interconnects the master cylinder to the slave cylinder and the hydraulic apparatus is filled with hydraulic fluid so that when the piston of the master cylinder is actuated the piston of the slave cylinder is simultaneously actuated by displacement of hydraulic fluid from the master cylinder to the slave cylinder through the conduit.

It is known to utilize such hydraulic actuators to operate the release mechanism of the friction clutch of a motor vehicle. It is also known to preassembly a hydraulic clutch actuator, fill the master cylinder, slave cylinder, conduit, and a reservoir connected to the master cylinder with hydraulic fluid, and then ship the preassembled and prefilled actuator to a motor vehicle manufacturer for installation on the motor vehicle. Preferably, the hydraulic fluid is maintained, by a resilient diaphragm disposed in the reservoir, at a pressure slightly higher than atmospheric pressure to prevent introduction of atmospheric air into the system during transportation, storage and installation. It is important to maintain the output member of the slave cylinder in a restrained position relative to the housing of the slave cylinder during transportation, storage and installation to maintain the desired internal pressure of the system and preclude the entry of air into the apparatus. In systems wherein the slave cylinder includes an output rod connected to the piston of the slave cylinder and projecting from the slave cylinder, the restraining strap may comprise a member secured to the housing and engaging the free end of the push rod to maintain the push rod in a desired retracted position. Restraining straps of this type are shown for example in U.S. Pat. Nos. 4,454,632; 4,551,976; 4,557,361; 4,665,802 and 4,766,804, all assigned to the assignee of the present invention.

However, some motor vehicle manufacturers assemble the engine of the motor vehicle on the engine dress line to include the clutch release lever with the output rod of the slave cylinder pivotally attached to the clutch release lever. In this situation, the preassembled and prefilled clutch actuator package delivered to the manufacturer includes the master cylinder, the conduit, and the slave cylinder with the output rod of the slave cylinder omitted. It is important to provide restraining means to maintain the piston of the prefilled slave cylinder in a retracted position during shipping, storage installation and it is further important to ensure that such restraining means does not interfere with the coupling of the slave cylinder output rod to the slave cylinder piston during the ultimate assembly of the motor vehicle by the motor vehicle manufacturer.

SUMMARY OF THE INVENTION

This invention relates to an improved restraining strap for use with a hydraulic cylinder assembly.

More particularly, this invention relates to a restraining strap for use with a hydraulic clutch actuator in which the slave cylinder is provided to the motor vehicle manufacturer in prefilled form but without the output rod of the slave cylinder.

According to the invention, the retraining strap includes a mounting portion adapted to be secured at the rear end thereof to the front end of the slave cylinder housing and extending forwardly therefrom to a location forwardly of the front end of the slave cylinder housing and a restraining portion joined at its front end to the front end of the mounting portion and extending rearwardly therefrom along the axis of the slave cylinder housing bore for entry into the open front end of the cylinder and restraining engagement with the piston. This arrangement provides an inexpensive and efficient means of maintaining the piston of the slave cylinder in a retracted position during shipping, storage and installation and facilitates the ultimate insertion of the output rod of the slave cylinder into the bore of the slave cylinder for engagement with the piston.

According to a further feature of the invention, the mounting portion of the restraining strap comprises a plurality of circumferentially spaced strips and the restraining portion includes a tubular member having a central axis adapted to be positioned coaxial with the axis of the slave cylinder bore. This arrangement allows the restraining strap to maintain the piston slave cylinder in a retracted position and allows the ready insertion of the slave cylinder output rod through the tubular member of the restraining strap for engagement with the piston of the slave cylinder.

According to a further feature of the invention, the rear end of the tubular portion is closed to define an end wall for engagement with the piston. This specific construction provides an arrangement in which the output rod of the slave cylinder may be inserted into the tubular member of the restraining strap to trap the end wall of the tubular member between the rear end of the output rod and the front end of the piston.

According to a further feature of the invention the piston includes a rounded socket at its front end and the end wall of the tubular member of the restraining strap is rounded for seating in the piston socket. This specific construction allows a firm and positive seating of the tubular member in the front end of the piston as well as a firm and positive seating of the output rod within the tubular member while yet allowing limited amounts of relative pivotal movement between the cylinder housing and the output rod.

According to a further feature of the invention, each of the strips comprising the mounting portion of the restraining strap includes a weakened portion. This arrangement allows the strip to break at the weakened portions upon the first actuation of the associated clutch mechanism of the vehicle so that the restraining strap does not interfere with the subsequent actuations of the clutch of the vehicle.

In the disclosed embodiment of the invention, the restraining portion of the restraining strap further includes an annular radially outwardly extending flange at the front end of the tubular member and the strips are attached at their front ends to circumferentially spaced locations on the radially outer periphery of the flange. This specific construction provides a simple, sturdy and effective means of maintaining the piston of the slave cylinder in a retracted position during shipping, storage and installation.

The invention further provides a hydraulic cylinder assembly including a housing defining an axial bore defining an open front end proximate the front end of the housing; a piston mounted for reciprocal movement in the bore; and a restraining strap secured to the housing proximate the front end of the housing and extending into the open front end of the bore for restraining engagement with the piston. This assembly, which is preferably provided in prefilled form, facilitates the use of a prefilled clutch actuator in situations where the output rod of the slave cylinder is pivotally secured to the release lever of the associated clutch.

BRIEF DESCRIPTION OF THE DRAWINGS

FIG. 1 is a schematic view of a hydraulic clutch actuator according to the invention;

FIG. 2 is a perspective view of a restraining strap employed in actuator of FIG. 1;

FIG. 3 is a detailed, exploded view showing aspects of the clutch actuator of FIG. 1;

FIG. 4 is a detailed view showing the manner in which the restraining strap of the invention clutch actuator is secured to the housing of the slave cylinder of the clutch actuator;

FIG. 5 is a further detailed view of the restraining strap the invention clutch actuator; and FIG. 6 is a cross-sectional view of the invention restraining strap.

DETAILED DESCRIPTION OF THE PREFERRED EMBODIMENTS

The hydraulic clutch actuator as seen in FIG. 1 includes a master cylinder assembly 10, a slave cylinder assembly 12, a conduit 14, and a clutch release lever assembly 16.

Master cylinder assembly 10 includes a cylindrical housing 18 adapted to be secured in known manner to a partition of the motor vehicle such as the firewall 20; a reservoir 22 communicating in known manner at its lower end with the bore of the master cylinder housing 18 and including a fill cap 24 carrying a diaphragm 26; and an input rod 28 adapted to be pivotally secured at one end 28a to the clutch pedal 30 of the associated motor vehicle and extending at its other end into the bore of the cylinder housing 18 for engagement with the piston of the master cylinder assembly so that pivotal, depressing movement of clutch pedal 30 by the vehicle operator results in known manner in the output of pressurized fluid through the discharge port 32 of the master cylinder for delivery through conduit 14 to slave cylinder assembly 12.

Slave cylinder assembly 12 includes a cylinder housing 34, a piston 36, and a restraining strap 38. Housing 34 defines a bore 34a which opens at its front end at the front end 34b of the housing and which is closed at its rear end by a housing end wall 34c defining the inlet 40 of the slave cylinder assembly. Piston 36 is mounted for reciprocal movement in bore 34a and carries an annular elastomeric seal 42 for sealing engagement with the wall of bore 34a. Cylinder 36 further includes a socket or recess 36a opening at the front end 36b of the piston and including a rear spherical end wall 36c. A snap ring 44 received in a suitable groove in cylinder housing 34 proximate the front end of the cylinder housing limits the extent of forward movement of piston 36 in bore 34a. Cylinder housing 34 is secured proximate the bell housing 46 of the associated motor vehicle by means of a bracket 48 suitably coupled to an annular flange 34d proximate the front end of the cylinder housing.

Restraining strap 38 is preferably formed as a unitary molded plastic member and includes a mounting portion 50 and a restraining portion 52.

Restraining portion 52 comprises a rigid tubular member 54 open at its front end 54a and closed at its rear end by a convexly and spherically rounded end wall 54b. Tubular member 54 is sized to fit snugly within piston socket 36a with convex end wall 54b seated in and against piston end wall 36c. Restraining portion 52 further includes an annular radially outwardly extending flange 56 at the front end of tubular member 54.

Mounting portion 50 is in the form of a pair of strips 58 integrally joined to circumferentially spaced, diametrically opposed locations on the outer periphery of flange 56 and each including a lug 58a at the outer, free end of the strip and a weakened portion 58b proximate the flange 56.

Strips 58 are adapted to be secured at their outer or rear ends to flange 34d of slave cylinder housing 34 such, for example, as by the use of circumferentially spaced lugs 34e on the outer periphery of flange 34d adapted to pass strips 58 with strip lugs 58a hooked around housing lugs 34e to restrain forward movement of the strips.

With the restraining strap assembled to the slave cylinder, the rear or outer ends of the strips 58 are secured to the flange 34d of the slave cylinder housing by the spaced lugs 34e; the strips extend forwardly from their attachment point to the slave cylinder housing to a location spaced forwardly from the front end of the slave cylinder housing to dispose the flange portion 56 of the restraining strap forwardly of the front end of the slave cylinder housing; and the tubular member 54 extends rearwardly in restraint fashion along the axis of the bore 34a of the slave cylinder housing into the open front end of the bore 34a to position the rear end of the tubular member 54 within the piston socket 36a and position the convexly rounded rear end 54b of tubular member 54 in seating engagement with the rounded rear end wall 36c of the piston socket.

It will be understood that the clutch actuator of the invention is supplied to a motor vehicle manufacturer in prefilled form with the diaphragm 26 in the reservoir 22 serving to maintain the fluid within the system in a slightly pressurized condition so that the restraining strap 38 acts to restrain the piston 36 within the bore 34a and maintain the piston in a position where it maintains the slightly pressurized state of the clutch actuator so as to preclude the entry of air into the system.

Clutch release lever assembly 16 includes a clutch release lever 60 and a slave cylinder output rod 62 pivotally secured at its forward end 62a to the upper end 60a of clutch release lever 60. Lever 60 passes in known manner through an opening 46a in clutch bell housing 46 for coaction with a clutch release bearing to engage and disengage the clutch in response to pivotal movement of lever 60 imparted by slave cylinder output rod 62 Output rod 62 has a diameter generally corresponding to the internal diameter of tubular member 54 and has a rounded front end 62b generally conforming in size and configuration to the concave socket 54c defined at the inner surface of tubular member convex end wall 54b.

The invention clutch actuator is intended for use in a situation where the motor vehicle manufacturer assembles the engine of the motor vehicle on the engine dress line to include the clutch release lever 60 with the output member 62 of the slave cylinder pivotally attached to the lever. The invention prefilled clutch actuator, with the piston 36 of the slave cylinder of the actuator restrained by restraining strap 38, is delivered in prefilled form to the motor vehicle manufacturing site where the master cylinder housing 18 is secured to vehicle firewall 20, slave cylinder housing 34 is secured to bracket 48, and output rod 62 is inserted into the open front end of tubular member 54 to position the rear end 62b of the output rod in the socket 54c defined at the rear end of tubular member 54 and thereby trap the end wall 54b of the tubular member between the rear end 62b of the slave cylinder output rod and the end wall 36c of the piston.

In this disposition, as the piston 36 is moved forwardly in the bore 34a in response to the first actuation of the clutch actuator upon pivotal movement of clutch pedal 30, weakened strip portions 58b break to allow the continued forward movement of the piston 36 and allow the pivotal movement of clutch release lever 60 by output rod 62 to disengage the clutch. Subsequent actuations of the clutch actuator take place with the tubular portion 54 of the restraining strap trapped between the output rod 62 and the cylinder 36 but with the reciprocal actuating movement of the slave cylinder piston 36 in the bore 34a unimpeded by the strips 58 since the strips have been broken during the first actuation of the clutch actuator at the weakened points 58b.

The invention will be seen to provide an inexpensive and effective restraining strap for use with a prefilled clutch actuator of the type intended for use in situations where the slave cylinder output member is assembled by the motor vehicle manufacturer as a part of the clutch release lever assembly.

Whereas a preferred embodiment of the invention has been illustrated and described in detail it will be apparent that various changes may be made in the disclosed embodiment without departing from the scope or spirit of the invention.

I claim:

1. A restraining strap for use with a hydraulic cylinder assembly including a housing and a piston mounted for reciprocal movement in the bore, said strap comprising:
   (A) a mounting portion adapted to be secured at the rear end thereof to the front end of the housing to extend forwardly therefrom to a location forwardly of the front end of the housing; and
   (B) a tubular restraining portion having an open front end and a closed rear end, being joined at its open front end to the front end of said mounting portion, and adapted to extend rearwardly therefrom along the axis of the housing bore for entry into the open front end of the cylinder for restraining engagement at its closed rear end with the piston.

2. A restraining strap according to claim 1 wherein:
   (C) said mounting portion comprises a plurality of circumferentially spaced strips; and
   (D) each of said strips includes a weakened portion.

3. A restraining strap according to claim 2 wherein:
   (E) said weakened portion of each strip is proximate the front end of the strip.

4. A restraining strap according to claim 1 wherein:
   (C) said strap further includes an annular radially outwardly extending flange at the front end of said tubular restraining portion; and
   (D) said strips are attached at their front ends to circumferentially spaced locations on the radially outer periphery of said flange.

5. A restraining strap for use with a hydraulic cylinder assembly including a housing defining a bore opening at the front end of the cylinder and a piston mounted for reciprocal movement in the bore, said strap comprising an integrally formed member including:
   (A) a central tubular portion open at its front end and closed at its rear end by a convexly rounded end wall; and
   (B) a pair of strips each having a front end and a rear end, joined integrally at their front ends to circumferentially spaced locations proximate the front end of said tubular portion, extending rearwardly from said tubular portion to define free rearward ends, having means at their free rearward ends for mounting engagement with circumferentially spaced locations on the cylinder housing, and each including a weakened portion between its ends.

6. A restraining strap according to claim 5 wherein:
   (C) said strap further includes an annular radially outwardly extending flange portion at the front end of said tubular portion; and
   (D) said strips are joined to circumferentially spaced locations on the outer periphery of said flange portion.

7. A hydraulic cylinder assembly comprising:
   (A) a housing defining an axial cylindrical bore having an open front end proximate the front end of the housing;
   (B) a solid cylindrical piston mounted for reciprocal movement in said bore; and
   (C) a restraining strap secured to said housing proximate said front end of said housing and extending into said open front end of said bore to a location rearwardly of said open front end of said bore for restraining engagement with said piston.

8. A hydraulic cylinder assembly according to claim 7 wherein:
   (D) said restraining strap includes a mounting portion secured at the rear end thereof to said housing and extending forwardly therefrom to a location forwardly of said front end of said housing and a restraining portion joined at its front end to the front end of said mounting portion and extending rearwardly therefrom into said open front end of said bore for restraining engagement with said piston.

9. A hydraulic cylinder assembly according to claim 9 wherein:
   (E) said mounting portion comprises a plurality of circumferentially spaced strips; and
   (F) said restraining portion includes a tubular member having a central axis positioned coaxial with the axis of said bore.

10. A restraining strap for use with a hydraulic cylinder assembly including a housing defining a bore opening at the front end of the housing and a piston mounted for reciprocal movement in the bore, said strap comprising:
    (A) a mounting portion adapted to be secured at the rear end thereof to the front end of the housing to extend forwardly therefrom to a location forwardly of the front end of the housing; and
    (B) a restraining portion joined at its front end to the front end of said mounting portion and adapted to extend rearwardly therefrom along the axis of the housing bore for entry into the open front end of the cylinder for restraining engagement with the piston;

(C) said mounting portion comprising a plurality of circumferentially spaced strips;

(D) said restraining portion including a tubular member having a central axis adapted to be positioned coaxially with the axis of the cylinder bore; and (E) the rear end of said tubular portion being closed to define an end wall for engagement with the piston.

11. A restraining strap according to claim 10 wherein the piston includes a rounded socket at its front end and said end wall is rounded for seating in the piston socket.

12. A hydraulic cylinder assembly comprising:

(A) a housing defining an axial bore having an open front end proximate the front end of the housing;

(B) a piston mounted for reciprocal movement in said bore; and (C) a restraining strap secured to said housing proximate said front end of said housing and extending into said front end of said bore for restraining engagement with said piston;

(D) said restraining strap including a mounting portion secured at the rear end thereof to said housing and extending forwardly therefrom to a location forwardly of said front end of said housing and a restraining portion joined at its front end to the front end of said mounting portion and extending rearwardly therefrom into said open front end of said bore for restraining engagement with said piston;

(E) said mounting portion comprising a plurality of circumferentially spaced strips;

(F) said restraining portion including a tubular member having a central axis positioned coaxial with the axis of said bore; and (G) the rear end of said tubular portion being closed to define an end wall for engagement with said piston.

13. A hydraulic cylinder assembly according to claim 12 wherein said piston includes a rounded socket at its front end and said end wall is rounded for seating in said piston socket.

14. A hydraulic cylinder assembly according to claim 13 wherein:

(H) each of said strips includes a weakened portion.

15. A hydraulic cylinder assembly according to claim 14 wherein:

(I) said weakened portion of each strip is proximate the front end of the strip.

16. A hydraulic cylinder assembly according to claim 15 wherein:

(J) said restraining portion further includes an annular radially outwardly extending flange at the front end of said tubular member; and (K) said strips are attached at their front ends to circumferentially spaced locations on the radially outer periphery of said flange.

17. A hydraulic cylinder assembly comprising:

(A) a housing defining an axial bore having an open front end proximate the front end of the housing;

(B) a piston mounted for reciprocal movement in said bore;

(C) a restraining strap secured to said housing proximate said front end of said housing and extending into said front end of said bore for restraining engagement with said piston;

(D) a clutch release lever adapted to extend into a clutch housing to actuate the clutch; and (E) a push rod pivotally secured at its front end to said release lever and extending at its rear end into said open front end of said bore for coaction with said piston.

18. A hydraulic cylinder assembly according to claim 17 wherein:

(F) said strap includes a tubular portion extending into said open front end of said bore; and (G) said rear end of said push rod is slidably received in said tubular portion of said restraining strap.

19. A hydraulic cylinder assembly according to claim 18 wherein:

(H) said tubular portion is closed at its rear end by an end wall;

(I) said end wall bears against the front end of said piston; and (J) said rear end of said push rod bears against said end wall.

20. A hydraulic cylinder assembly according to front end;

(K) said piston includes a rounded recess in its front end;

(L) said end wall is convexly rounded and fits in said recess; and (M) said rear end of said push rod is rounded and seats in a recess defined by said rounded end wall.

21. A hydraulic cylinder assembly according to claim 18 wherein:

(H) said cylinder housing is filled with hydraulic fluid rearwardly of said piston.

22. A clutch actuator for a motor vehicle comprising:

(A) a slave cylinder including a housing defining a cylindrical axial bore having an open front end proximate the front end of the housing a solid cylindrical piston mounted for reciprocal movement in said bore;

(B) a conduit connected at one end thereof to the inlet of said slave cylinder;

(C) a master cylinder assembly having a discharge connected to the other end of said conduit and an input rod adapted to be secured to the clutch pedal of the vehicle and operative in response to operation of the clutch pedal to deliver hydraulic fluid to said slave cylinder through said conduit; and (D) a restraining strap secured to said slave cylinder housing and extending into said open front end of said bore to a location rearwardly of said front end of said bore for restraining engagement with said piston.

23. A clutch actuator according to claim 22 wherein:

(E) said restraining strap includes a mounting portion secured at the rear end thereof to said housing and extending forwardly therefrom to a location forwardly of said front end of said housing and a restraining portion joined at its front end to the front end of said mounting portion and extending rearwardly therefrom into said open front end of said bore for restraining engagement with said piston.

24. A clutch actuator according to claim 23 wherein:

(F) said mounting portion comprises a plurality of circumferentially spaced strips; and (G) said restraining portion includes a tubular member having a central axis coaxial with the axis of said bore.

25. A hydraulic cylinder assembly comprising:

(A) a housing defining an axial bore having an open front end proximate the front end of said housing;
(B) a solid piston mounted for reciprocal movement in said bore; and
(C) a retraining strap secured to said housing proximate said front end of said housing and extending into said front end of said bore to a location rearwardly of said front end of said bore for restraining engagement with said piston.

26. A clutch actuator for a motor vehicle comprising:
(A) a slave cylinder including a housing defining a bore having an open front end proximate the front end of the housing and a piston mounted for reciprocal movement in said bore;
(B) a conduit connected at one end thereof to the inlet of said slave cylinder;
(C) a master cylinder assembly having a discharge connected to the other end of said conduit and an input rod adapted to be secured to the clutch pedal of the vehicle and operative in response to operation of the clutch pedal to deliver hydraulic fluid to said slave cylinder through said conduit; and
(D) a restraining strap secured to said slave cylinder housing and extending into said open front end of said bore for restraining engagement with said piston;
(E) said restraining strap including a mounting portion secured at the rearward end thereof to said housing and extending forwardly therefrom to a location forwardly of said front end of said housing and a restraining portion joined at its front end to the front end of said mounting portion and extending rearwardly therefrom into said open front end of said bore for restraining engagement with said piston;
(F) said mounting portion comprising a plurality of circumferentially spaced strips;
(G) said restraining portion including a tubular member having a central axis coaxial with the axis of said bore;
(H) the rear end of said tubular portion being closed to define an end wall for engagement with said piston.

27. A clutch actuator according to claim 26 wherein said piston includes a rounded socket at its front end and said end wall is rounded for seating in said piston socket.

28. A clutch actuator according to claim 27 wherein:
(I) each of said strips include a weakened portion.

29. A clutch actuator according to claim 28 wherein:
(J) said weakened portion at each strip is proximate the front end of the strip.

30. A clutch actuator according to claim 29 wherein:
(K) said restraining portion further includes an annular radially outward extending flange at the front end of said tubular member; and
(L) said strips are attached at their front ends to circumferentially spaced locations on the radially outer periphery of said flange.

31. A clutch actuator for a motor vehicle comprising:
(A) a slave cylinder including a housing defining a bore having an open front end proximate the front end of the housing and a piston mounted for reciprocal movement in said bore;
(B) a conduit connected at one end thereof to the inlet of said slave cylinder;
(C) a master cylinder assembly having a discharge connected to the other end of said conduit and an input rod adapted to be secured to the clutch pedal of the vehicle and operative in response to operation of the clutch pedal to deliver hydraulic fluid to said slave cylinder through said conduit;
(D) a restraining strap secured to said slave cylinder housing and extending into said open front end of said bore for restraining engagement with said piston;
(E) a clutch release lever adapted to extend into a clutch housing to actuate the clutch; and
(F) a push rod pivotally secured at its front end to said release lever and extending at its rear end into said open front end of said bore for coaction with said piston.

32. A clutch actuator according to claim 31 wherein:
(O) said strap includes a tubular portion extending into said front end of said bore; and
(P) said rear end of said push rod is slidably received in said tubular portion of said restraining strap.

33. A clutch actuator according to claim 32 wherein:
(Q) said tubular portion is closed at its rear end by an end wall;
(R) said end wall bears against the front end of said piston; and
(S) said rear end of said push rod bears against said end wall.

34. A clutch actuator according to claim 33 wherein said piston includes a rounded recess in its front end;
(T) said end wall is convexly rounded and fits in said recess; and
(U) said rear end of said push rod is rounded and seats in a recess defined by said rounded end wall.

35. A clutch actuator according to claim 34 wherein the master cylinder, slave cylinder and conduit are filled with hydraulic fluid.

* * * * *

UNITED STATES PATENT AND TRADEMARK OFFICE
CERTIFICATE OF CORRECTION

PATENT NO.  : 5,002,169
DATED       : March 26, 1991
INVENTOR(S) : David C. Barker It is certified that error appears in the above-identified patent and that said Letters Patent is hereby corrected as shown below:

Column 3, Line 18, Please delete "in actuator" and insert -- in the clutch actuator --.

Column 3, Line 27, Please delete "strap the invention" and insert -- strap utilized in the invention --.

Column 4, Line 37, Please delete "restrant fashion" and insert -- reentrant fashion --.

Column 4, Lines 61 and 62, Please delete "rod 62 Output" and insert -- rod 62. Output --.

Column 8, Line 21, Please delete "to front end" and insert -- claim 19 wherein: --.

Signed and Sealed this

Twenty-eighth Day of July, 1992

Attest:

DOUGLAS B. COMER

Attesting Officer     Acting Commissioner of Patents and Trademarks